United States Patent
Yu et al.

(10) Patent No.: US 12,015,767 B2
(45) Date of Patent: Jun. 18, 2024

(54) INTRA-FRAME PREDICTIVE CODING METHOD AND SYSTEM FOR 360-DEGREE VIDEO AND MEDIUM

(71) Applicant: HUAZHONG UNIVERSITY OF SCIENCE AND TECHNOLOGY, Hubei (CN)

(72) Inventors: Li Yu, Hubei (CN); Zhewen Sun, Hubei (CN)

(73) Assignee: HUAZHONG UNIVERSITY OF SCIENCE AND TECHNOLOGY, Hubei (CN)

( * ) Notice: Subject to any disclaimer, the term of this patent is extended or adjusted under 35 U.S.C. 154(b) by 0 days.

(21) Appl. No.: 18/447,252

(22) Filed: Aug. 9, 2023

(65) Prior Publication Data

US 2024/0080439 A1 Mar. 7, 2024

(30) Foreign Application Priority Data

Aug. 29, 2022 (CN) .......................... 202211039982.6

(51) Int. Cl.
| | |
|---|---|
| H04N 19/105 | (2014.01) |
| H04N 19/119 | (2014.01) |
| H04N 19/147 | (2014.01) |
| H04N 19/176 | (2014.01) |
| H04N 19/96 | (2014.01) |

(52) U.S. Cl.
CPC ......... *H04N 19/105* (2014.11); *H04N 19/119* (2014.11); *H04N 19/147* (2014.11); *H04N 19/176* (2014.11); *H04N 19/96* (2014.11)

(58) Field of Classification Search
None
See application file for complete search history.

(56) References Cited

U.S. PATENT DOCUMENTS

| | | | | |
|---|---|---|---|---|
| 2019/0373281 | A1* | 12/2019 | Wang | .................. H04N 19/159 |
| 2020/0154111 | A1* | 5/2020 | Wang | .................. H04N 19/176 |

FOREIGN PATENT DOCUMENTS

| | | |
|---|---|---|
| CN | 104581181 | 4/2015 |
| CN | 114286093 | 4/2022 |

OTHER PUBLICATIONS

"Office Action of China Counterpart Application", issued on Oct. 11, 2022, with English translation thereof, pp. 1-12.

* cited by examiner

*Primary Examiner* — Kaitlin A Retallick

(74) *Attorney, Agent, or Firm* — JCIPRNET

(57) ABSTRACT

An intra-frame predictive coding method, medium and system for a 360-degree video belong to video coding field are provided. The method includes: inputting features of a coding unit (CU) block to be partitioned into a neural network when intra-frame block partition (IFBP) is performed on a current CU block (CCUB), skipping a partition mode that the output of the neural network is smaller than threshold, and obtaining a plurality of IFBP schemes; determining a length n of a rough mode decision candidate list according to a CU feature and a texture feature of the sub-CU block when an intra-frame angle mode is decided to decide the intra-frame angle mode and to fill pixels in each IFBP scheme; calculating rate distortion optimization (RDO) loss between each IFBP scheme and the CCUB after pixel filling and performing intra-frame coding predictive coding on the CCUB based on the scheme.

10 Claims, 4 Drawing Sheets

```
┌─────────────────────────────────────────────────────────────────┐
│ Inputting a coding unit feature, a texture feature, and a 360-degree video feature │
│    of a coding unit (CU) block to be partitioned into a neural network            │
│   corresponding to each partition mode when intra-frame block partition is        │
│ performed on a current CU block, skipping a partition mode in which the output    │  S1
│    of the neural network is smaller than a corresponding output threshold,        │
│   performing the intra-frame block partition on the CU block to be partitioned   │
│    according to a partition mode that is not skipped, and obtaining a plurality of│
│          intra-frame block partition schemes of the current CU block,             │
│  where intra-frame block partition modes comprise QT, BTH, BTV, TTH, and          │
│  TTV, and the CU block to be partitioned is the current CU block or a sub-CU      │
│              block obtained after each intra-frame block partition                │
└─────────────────────────────────────────────────────────────────┘
                                    │
                                    ▼
┌─────────────────────────────────────────────────────────────────┐
│   Determining a length n of a rough mode decision (RMD) candidate list           │
│  according to the coding unit feature and the texture feature of the sub-CU block│  S2
│  when an intra-frame angle mode is decided for each sub-CU block in each intra-  │
│  frame block partition scheme, deciding the intra-frame angle mode based on the  │
│  RMD candidate list of the length n, and obtaining the intra-frame angle mode to │
│             fill pixels in each intra-frame block partition scheme               │
└─────────────────────────────────────────────────────────────────┘
                                    │
                                    ▼
┌─────────────────────────────────────────────────────────────────┐
│    Calculating rate distortion optimization (RDO) loss between each intra-       │
│      frame block partition scheme and the current CU block after pixel filling   │  S3
│      and performing intra-frame coding predictive coding on the current CU       │
│   block based on the intra-frame block partition scheme corresponding to the     │
│                             minimum RDO loss                                      │
└─────────────────────────────────────────────────────────────────┘
                                    │
                                    ▼                                              S4
┌─────────────────────────────────────────────────────────────────┐
│ Repeatedly executing S1 to S3 until intra-frame predictive coding is performed   │
│              on all CU blocks of the 360-degree video frame                      │
└─────────────────────────────────────────────────────────────────┘
```

FIG. 1

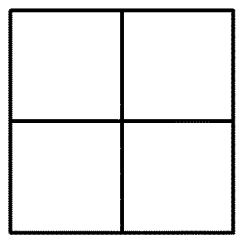

FIG. 2A

INTRA-FRAME PREDICTIVE CODING METHOD AND SYSTEM FOR 360-DEGREE VIDEO AND MEDIUM

CROSS-REFERENCE TO RELATED APPLICATION

This application claims the priority benefit of Chinese application serial no. 202211039982.6, filed on Aug. 29, 2022. The entirety of the above-mentioned patent application is hereby incorporated by reference herein and made a part of this specification.

BACKGROUND

Technical Field

The disclosure belongs to the field of video coding, and in particular, relates to an intra-frame predictive coding method and system for a 360-degree video and a medium.

Description of Related Art

With the development of multimedia technology, people's demand for virtual reality (VR) has increased. VR videos are stored as ultra-high-definition 360-degree videos most of the time. Compared to the conventional two-dimensional videos, VR videos exhibit a significant difference in ultra-high resolution and image deformation caused by projection. The commonly-used mainstream coding platforms such as H.264/H.265 and AVS2 are gradually unable to meet people's growing needs, so the versatile video coding (VVC) has surfaced. VVC introduces many new technologies with good compression performance in each module. The introduction of these new technologies improves the performance of video coding, but at the same time makes the coding complexity rise sharply.

Among these new techniques, the quadtree with nested multi-type tree (QTMTT) structure of nested multi-type trees is introduced for intra-frame block partitioning. This technology enables VVC coding units to have more flexible shapes and more diverse sizes, so as to better fit images of different sizes and shapes. In addition, the number of angle modes for intra-frame prediction increases from 33 in HEVC to 65, and the DC and Planar modes remain unchanged in VVC. More angle modes make the pixel mapping more refined. However, these improvements greatly increase the complexity of coding while improving the compression performance of VVC, so that the coding time becomes excessively long.

SUMMARY

In view of the above defects and improvement requirements of the related art, the disclosure provides an intra-frame predictive coding method and system for a 360-degree video and a medium aiming to reduce unnecessary processes in the conventional coding methods and to further shorten the coding time.

To achieve the above, in an aspect of the disclosure, the disclosure provides an intra-frame predictive coding method for a 360-degree video, and the method includes the following steps. In S1, when intra-frame block partition is performed on a current coding unit (CU) block, a coding unit feature, a texture feature, and a 360-degree video feature of a CU block to be partitioned are inputted into a neural network corresponding to each partition mode, a partition mode in which the output of the neural network is smaller than a corresponding output threshold is skipped, the intra-frame block partition is performed on the CU block to be partitioned according to a partition mode that is not skipped, and a plurality of intra-frame block partition schemes of the current CU block are obtained. Intra-frame block partition modes include QT, BTH, BTV, TTH, and TTV, and the CU block to be partitioned is the current CU block or a sub-CU block obtained after each intra-frame block partition. In S2, when an intra-frame angle mode is decided for each sub-CU block in each intra-frame block partition scheme, a length n of a rough mode decision (RMD) candidate list is determined according to the coding unit feature and the texture feature of the sub-CU block, intra-frame angle mode decided based on the RMD candidate list of the length n, and the intra-frame angle mode is obtained to fill pixels in each intra-frame block partition scheme. In S3, rate distortion optimization (RDO) loss between each intra-frame block partition scheme and the current CU block is calculated after pixel filling, and intra-frame coding predictive coding is performed on the current CU block based on the intra-frame block partition scheme corresponding to the minimum RDO loss. In S4, operation S1 to operation S3 are repeatedly executed until intra-frame predictive coding is performed on all CU blocks of the 360-degree video frame.

Further, the coding unit feature includes: several ones of a width, a height, a depth, a quadtree depth, a multi-tree depth, a block shape ration, a quantization parameter, a horizontal angle mode type, and a vertical angle mode type of a CU block. The texture feature includes several ones of a variance of a pixel value, a normalized mean square error, a horizontal texture factor, a vertical texture factor, a weight between the horizontal and vertical textures, and directional complexity of the CU block. The 360-degree video feature includes a latitude of the CU block and a sampling factor at each latitude.

Further, in the BTH and TTH partition modes, the block shape ration is h/(w+h), in the BTV and TTV partition modes, the block shape ration is w/(w+h), and in the QT partition mode, the block shape ration is 0.5, where w and h are the width and height of the CU block, respectively.

Further, the weights and directional complexity of the horizontal texture factor, the vertical texture factor, and the horizontal and vertical texture are:

$$\text{Texture}_H = \frac{\sum_{i=2}^{w-1}\sum_{j=2}^{h-1}|\text{Sobel}_H * P_{3\times3}(i,j)|}{(w-2)\times(h-2)},$$

$$\text{Texture}_V = \frac{\sum_{i=2}^{w-1}\sum_{j=2}^{h-1}|\text{Sobel}_V * P_{3\times3}(i,j)|}{(w-2)\times(h-2)},$$

$$ratioT_HT_V = \text{Texture}_H/\text{Texture}_V, \text{ and}$$

$$compT_HT_V = \text{Texture}_H + \text{Texture}_V,$$

where $\text{Texture}_H$ is the horizontal texture factor, $\text{Texture}_V$ is the vertical texture factor, $ratioT_HT_V$ is the weight between the horizontal and vertical textures, $compT_HT_V$ is the directional complexity, w and h are the width and height of the CU block respectively, $\text{Sobel}_H$ is a horizontal Sobel operator, $\text{Sobel}_V$ is a vertical Sobel operator, $P_{3\times3}(i,j)$ represents a 3×3 matrix centered on the pixel with coordinates (i,j), and * is a convolution operation.

Further, the sampling factor at each latitude is:

$$K_{Latitude} = 1/\cos(\text{Latitude}),$$

where $K_{Latitude}$ is the sampling factor at the Latitude latitude.

Further, when $w \geq w_{th}$, $h \geq h_{th}$, $var < var_{th}$, $NMSE < NMSE_{th}$, and $compT_HT_V < comp_{th}$, the length n is 1, and when $w \geq w_{th}$ && $h \geq h_{th}$ && $(ratioT_HT_V > th_H \| 1/ratioT_HT_V > th_V)$, the length n is 2; otherwise, the length n is 3, where w and h respectively are the width and the height the CU block, var and NMSE respectively are the variance of the pixel value and the normalized mean square error of the CU block, $compT_HT_V$ is the directional complexity, $ratioT_HT_V$ is the weight between the horizontal and vertical textures, $w_{th}$, $h_{th}$, $var_{th}$, $NMSE_{th}$, and $comp_{th}$ respectively are threshold values corresponding to w, h, var, NMSE, and $compT_HT_V$, $th_H$ is a threshold value of the horizontal angle mode, and $th_V$ is a threshold value of the vertical angle mode.

Further, the deciding the intra-frame angle mode based on the RMD candidate list of the length n includes the following steps. A first-round RMD candidate list is established based on the length n, mode values in the first-round RMD candidate list are uniformly added or uniformly subtracted by 1, and updating is performed to obtain a second-round RMD candidate list. A most probable mode (MPM) list is calculated and obtained according to a mode of a left CU and a mode of an upper CU of the sub-CU block, and the MPM list is merged into the second-round RMD candidate list to obtain an RDO list. RDO calculation is performed on modes in the RDO list to decide an optimal mode as the intra-frame angle mode of the sub-CU block.

Further, the intra-frame block partition is performed on the CU block to be partitioned according to the partition mode that is not skipped in S1 and the CU block to be partitioned is not partitioned to generate the plurality of intra-frame block partition schemes of the current CU block.

According to another aspect of the disclosure, the disclosure further provides an intra-frame predictive encoding system for a 360-degree video, and the system includes a fast partition module, a mode deciding module, and a coding module. The fast partition module is configured to input a coding unit feature, a texture feature, and a 360-degree video feature of a coding unit (CU) block to be partitioned into a neural network corresponding to each partition mode when intra-frame block partition is performed on a current CU block, skip a partition mode in which the output of the neural network is smaller than a corresponding output threshold, perform the intra-frame block partition on the CU block to be partitioned according to a partition mode that is not skipped, and obtain a plurality of intra-frame block partition schemes of the current CU block. Intra-frame block partition modes include QT, BTH, BTV, TTH, and TTV, and the CU block to be partitioned is the current CU block or a sub-CU block obtained after each intra-frame block partition. The mode deciding module is configured to determine a length n of a rough mode decision (RMD) candidate list according to the coding unit feature and the texture feature of the current CU block when an intra-frame angle mode is decided for each sub-CU block in each intra-frame block partition scheme, decide the intra-frame angle mode based on the RMD candidate list of the length n, and obtain the intra-frame angle mode to fill pixels in each intra-frame block partition scheme. The coding module is configured to calculate rate distortion optimization (RDO) loss between each intra-frame block partition scheme and the current CU block after pixel filling and perform intra-frame coding predictive coding on the current CU block based on the intra-frame block partition scheme corresponding to the minimum RDO loss. The fast partition module, the mode deciding module, and the coding module are repeatedly executed until intra-frame predictive coding is performed on all CU blocks of the 360-degree video frame.

According to another aspect of the disclosure, the disclosure further provides a computer-readable storage medium storing a computer program, and the computer program implements the abovementioned intra-frame predictive coding method for the 360-degree video when being executed by a processor.

BRIEF DESCRIPTION OF THE DRAWINGS

FIG. 1 is a flow chart of an intra-frame predictive coding method for a 360-degree video according to an embodiment of the disclosure.

FIG. 2A, FIG. 2B, FIG. 2C, FIG. 2D and FIG. 2E are schematic diagrams of intra-frame block partition modes of QT, BTH, BTV, TTH, and TTV in versatile video coding (VVC), respectively.

DESCRIPTION OF THE EMBODIMENTS

Figure 2B:
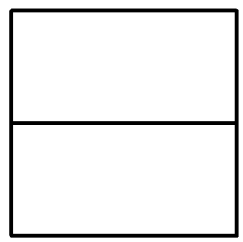
Figure 2C:
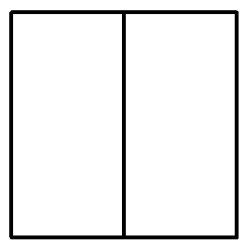
Figure 2D:
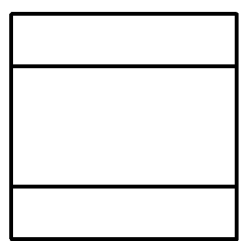
Figure 2E:
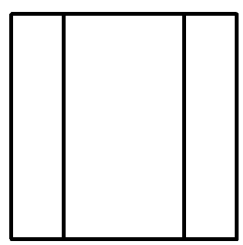

In order to make the objectives, technical solutions, and advantages of the disclosure clearer and more comprehensible, the disclosure is further described in detail with reference to the drawings and embodiments. It should be understood that the specific embodiments described herein serve to explain the invention merely and are not used to limit the invention. In addition, the technical features involved in the various embodiments of the invention described below can be combined with each other as long as the technical features do not conflict with each other.

In the disclosure, the terms "first", "second", and the like (if any) in the disclosure and the accompanying drawings are used to distinguish similar objects, and are not necessarily used to describe a specific order or sequence.

FIG. 1 is a flow chart of an intra-frame predictive coding method for a 360-degree video according to an embodiment of the disclosure. With reference to FIG. 1 in combination with FIG. 2A to FIG. 4, an intra-frame predictive coding method for a 360-degree video in this embodiment will be described in detail, and the method includes operation S1 to operation S4.

In operation S1, when intra-frame block partition is performed on a current coding unit (CU) block, a coding unit feature, a texture feature, and a 360-degree video feature of a CU block to be partitioned are inputted into a neural network corresponding to each partition mode, a partition mode in which the output of the neural network is smaller than a corresponding output threshold is skipped, the intra-frame block partition is performed on the CU block to be partitioned according to a partition mode that is not skipped, and a plurality of intra-frame block partition schemes of the current CU block are obtained. Intra-frame block partition modes include QT, BTH, BTV, TTH, and TTV, and the CU block to be partitioned is the current CU block or a sub-CU block obtained after each intra-frame block partition.

In this embodiment, considering the difference and commonality between a 360-degree video and a conventional two-dimensional planar video, the three types of features, namely the coding unit feature, the texture feature, and the 360-degree video feature, are predefined.

In this embodiment, a data set is created based on the predefined features. Since there are five intra-frame block partition modes in versatile video coding (VVC), namely QT, BTH, BTV, TTH, and TTV as shown in FIG. 2A, FIG. 2B, FIG. 2C, FIG. 2D, and FIG. 2E, respectively, a separate data set and a separate network are constructed for each partition mode for training. The data of the data set is finally obtained by recording, processing, and storing different video sequences in the process of coding using the convention mode of VVC with all-intra (AI) configuration under different quantization parameters. The storage form of a piece of data should include one or a plurality of features and a label, where the features are predefined features, and the label is 0 or 1, indicating whether the current CU is partitioned into a certain type.

In order to evaluate the effectiveness of features, in this embodiment, the correlation between features and label and the correlation between features are calculated by Pearson correlation coefficient. The decision criterion is that the correlation between features and label is as high as possible, and the correlation between features is as low as possible. Based on the above, specific and appropriate features are decided for the above three types of features to achieve data dimensionality reduction and to reduce algorithm complexity.

In video coding, a frame of image is divided into several rectangular blocks, and these units may be called recursively for more detailed division. Information such as the size and shape of these blocks may be used as important features most of the time, and such features are formed as coding unit (CU) features.

According to an embodiment of the disclosure, the coding unit feature includes several ones of a width, a height, a depth, a quadtree depth, a multi-tree depth, a block shape ration, a quantization parameter, a horizontal angle mode type, and a vertical angle mode type of a CU block. It should be noted that during the intra-frame block partition process, the CU block herein is the CU block to be partitioned. In this embodiment, a quantization parameter (QP) is introduced as a feature, and generally, when the QP is small, an encoder tends to partition the CU into smaller sub-CUs.

An aspect ratio of a CU block reflects the degree of inclination of the CU block to different partitions when it is partitioned. Based on the above, a self-defined block shape ration (BSR) is introduced in this embodiment to measure the shape of a CU block. In the BTH and TTH partition modes, the block shape ration BSR is h/(w+h), in the BTV and TTV partition modes, the block shape ration BSR is w/(w+h), and in the QT partition mode, the block shape ration BSR is 0.5, wherein w and h are the width and height of the CU block, respectively.

There are 67 intra-frame modes in VVC, including DC mode, planar mode, and 65 angle modes. The 65 angle modes correspond to 65 directions, and these angle modes may reflect the texture direction of the CU block to a certain extent. BT partition and TT partition have two directions, horizontal and vertical, and 65 angle modes are partitioned into horizontal mode and vertical mode. Typically, [2, 34] is defined as the horizontal mode, and [35, 66] is defined as the vertical mode. Based on the above, in this embodiment, the horizontal angle mode type isHorMode is defined to determine whether the current angle mode is the horizontal mode, and if it is the horizontal mode, it is 1, otherwise it is 0. Further, the vertical angle mode type isVerMode is defined to determine whether the current angle mode is the vertical mode, and if it is the vertical mode, it is 1, otherwise it is 0.

The intra-frame wide-angle prediction technique introduced in VVC adaptively replaces some conventional angle modes with intra-frame wide-angle prediction modes according to the aspect ratio of the CU block, but still uses the original angle mode index. That is, for CU blocks of different shapes, angle modes with the same value no longer correspond to the same angle, which may lead to differences in classification of horizontal angles and vertical angles. Therefore, in this embodiment, the above manner of determining whether the current angle mode is the horizontal mode is corrected according to the shape of the CU block. The correction rule is: when the width of the CU block is smaller than its height, [2, 34] and [$th_V$+1, 66] are defined as the horizontal mode and [35, $th_V$] is defined as the vertical mode, when the width of the CU block is equal to its height, [2, 34] is defined as the horizontal mode and [35, 66] is defined as the vertical mode, and when the width of the CU block is greater its height, [$th_H$, 34] is defined as the horizontal mode and [2, $th_H$−1] and [35, 66] are defined as the vertical mode, where $th_H$ is a threshold value of the horizontal angle mode and $th_V$ is a threshold value of the vertical angle mode, and the values may be set according to actual needs. In this embodiment, the angle mode may be set simply according to the size of the length and width of the CU or may be set more finely according to the aspect ratio of 2, 4, 8 . . . .

The CU block is partitioned into different sizes and shapes in order to better fit the texture of the actual content in the video image. The texture feature obtained by calculating the pixels exhibits good performance. According to an embodiment of the disclosure, the texture feature includes: several ones of a variance of a pixel value, a normalized mean square error, a horizontal texture factor, a vertical texture factor, a weight between the horizontal and vertical textures, and directional complexity of the CU block.

The variance of the pixel value of the CU block is used to measure the global complexity of the CU block, and the normalized mean square error of the pixel value of the CU block is used to measure the local complexity of the CU block. Considering the directionality of block partitioning, the Sobel operator is also introduced. The convolution of the Sobel operator and the pixel value of the CU block can measure the distribution of pixels in the horizontal direction and vertical direction, and the horizontal texture factor and the vertical texture factor are calculated through:

$$\text{Texture}_H = \frac{\sum_{i=2}^{w-1} \sum_{j=2}^{h-1} |\text{Sobel}_H * P_{3\times 3}(i, j)|}{(w-2) \times (h-2)},$$

$$\text{Texture}_V = \frac{\sum_{i=2}^{w-1} \sum_{j=2}^{h-1} |\text{Sobel}_V * P_{3\times 3}(i, j)|}{(w-2) \times (h-2)},$$

$$\text{Sobel}_H = \begin{bmatrix} 1 & 2 & 1 \\ 0 & 0 & 0 \\ -1 & -2 & -1 \end{bmatrix}, \text{ and}$$

$$\text{Sobel}_V = \begin{bmatrix} 1 & 0 & -1 \\ 2 & 0 & -2 \\ 1 & 0 & -1 \end{bmatrix},$$

where $\text{Texture}_H$ is the horizontal texture factor, $\text{Texture}_V$ is the vertical texture factor, w and h are the width and height of the CU block respectively, $\text{Sobel}_H$ is a horizontal Sobel operator, $\text{Sobel}_V$ is a vertical Sobel operator, $P_{3\times 3}(i,j)$ represents a 3×3 matrix centered on the pixel with coordinates (i,j), and * is a convolution operation. Further, in order for the Sobel operator to be prevented from going beyond the block boundaries, the operator only moves on (w−2)×(h−2) blocks instead of w×h.

In order to measure which direction the overall texture is more inclined to when the horizontal texture and the vertical texture are both higher or lower, the weight ratio$T_H T_V$ between the horizontal and vertical textures is provided to measure the weight relationship between the horizontal texture and the vertical texture. Considering that the binary tree partition and ternary tree partition in VVC only have two directions, horizontal and vertical, and the variance of the pixel value and the normalized mean square error of the CU block are used to measure global complexity and local complexity, textures containing various directions may not be able to better highlight the complexity of textures in a specific direction to a certain extent. Therefore, the directional complexity comp$T_H T_V$ is introduced in this embodiment to measure the complexity of the CU block, and the weight ratio$T_H T_V$ and directional complexity comp$T_H T_V$ between the horizontal and vertical textures respectively are:

$$\text{ratio}T_H T_V = \text{Texture}_H / \text{Texture}_V \text{ and}$$

$$\text{comp}T_H T_V = \text{Texture}_H + \text{Texture}_V$$

A 360-degree video is stored in an equi-rectangular projection (ERP) format most of the time. This projection method is simple and intuitive, the linear transformation calculation makes it easier to operate, and it does not have the disadvantage of surface discontinuity. This projection mode is thereby widely used. The feature of ERP format video is that there is obvious stretching deformation in the polar regions. Through statistical analysis, the CU blocks in the polar regions are larger, flatter, and have horizontal textures. This feature allows some unlikely partition modes to be skipped. Based on the above, in this embodiment, the latitude Latitude of the central point of the CU block in the whole image is introduced to measure the position of the CU block. In addition, considering the fact that the sampling points of regions at different latitudes are different due to the horizontal stretching of the image, a sampling factor $K_{Latitude}$ is also introduced to simulate this situation. According to an embodiment of the disclosure, the 360-degree video feature includes a latitude of the CU block and a sampling factor at each latitude.

$$K_{Latitude} = 1/\cos(\text{Latitude}),$$

where $K_{Latitude}$ is the sampling factor at the Latitude latitude.

Figure 3:
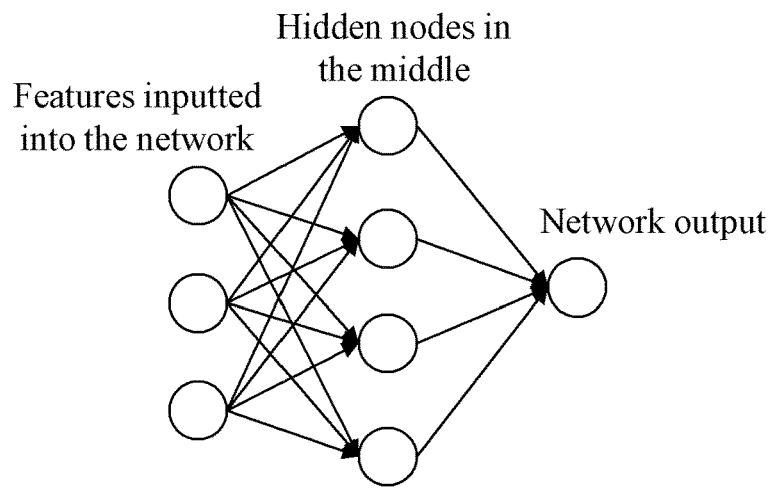
FIG. 3 is a schematic diagram of a neural network according to an embodiment of the disclosure.

In this embodiment, a classifier model is constructed based on the neural network, the extracted coding unit feature, texture feature, and the 360-degree video feature are inputted into the classifier model corresponding to each division mode, and the output configured to determine whether to skip the corresponding partition mode is obtained. In this embodiment, a multi-layer perceptron is introduced to build a lightweight neural network (LNN). In this way, the light weight of the model is ensured while the high accuracy is achieved in dealing with the classification problem, and its schematic diagram is shown in FIG. 3. With reference to FIG. 3, the neural network has three layers, the leftmost nodes represent the input, and each node corresponds to a predefined feature. The rightmost node represents the output, which is used to determine whether to skip the corresponding partition mode according to the output. The number of nodes in the middle layer is not fixed and may be weighted and decided according to the complexity and accuracy of the network.

The output of the neural network is a floating point number between 0 and 1. To implement the binary classification task of whether to partition, it is necessary to set the output threshold value to divide the (0, 1) interval into two, and the output threshold value is set to 0.5, for example. Fine-tuning may also be made according to the experimental results, so as to be able to correctly classify the output of the neural network into two categories.

For CU partitioning, in addition to the five types of partition of QTMT in VVC, no partition is also a mode that needs to be traversed, and the attempt of no partition is performed before QTMT. Therefore, before QTMT is performed, the information in the CU coding process may be extracted through the CU non-partitioning attempt and used as a feature for subsequent QTMT partition skipping determination. According to an embodiment of the disclosure, the intra-frame block partition is performed on the CU block to be partitioned according to the partition mode that is not skipped in S1 and the CU block to be partitioned is not partitioned to generate the plurality of intra-frame block partition schemes of the current CU block.

The 360-degree video includes a plurality of CU blocks. For any CU block, in the process of performing the intra-frame block partition on the CU block, it is determined whether to skip part of the partition modes in QT, BTH, BTV, TTH, and TTV based on the size relationship between the corresponding output of the coding unit feature, the texture feature, and the 360-degree video feature and the output threshold, and partition is performed based on the partition mode that is not skipped. The sub-CU blocks obtained through partitioning are partitioned again in the above manner until the optimal partition mode of the finally obtained sub-CU blocks is no partition, so that a large number of intra-frame block partition schemes are generated for the CU block.

In operation S2, when an intra-frame angle mode is decided for each sub-CU block in each intra-frame block partition scheme, a length n of a rough mode decision (RMD) candidate list is determined according to the coding unit feature and the texture feature of the sub-CU block, intra-frame angle mode decided based on the RMD candidate list of the length n, and the intra-frame angle mode is obtained to fill pixels in each intra-frame block partition scheme.

Figure 4:
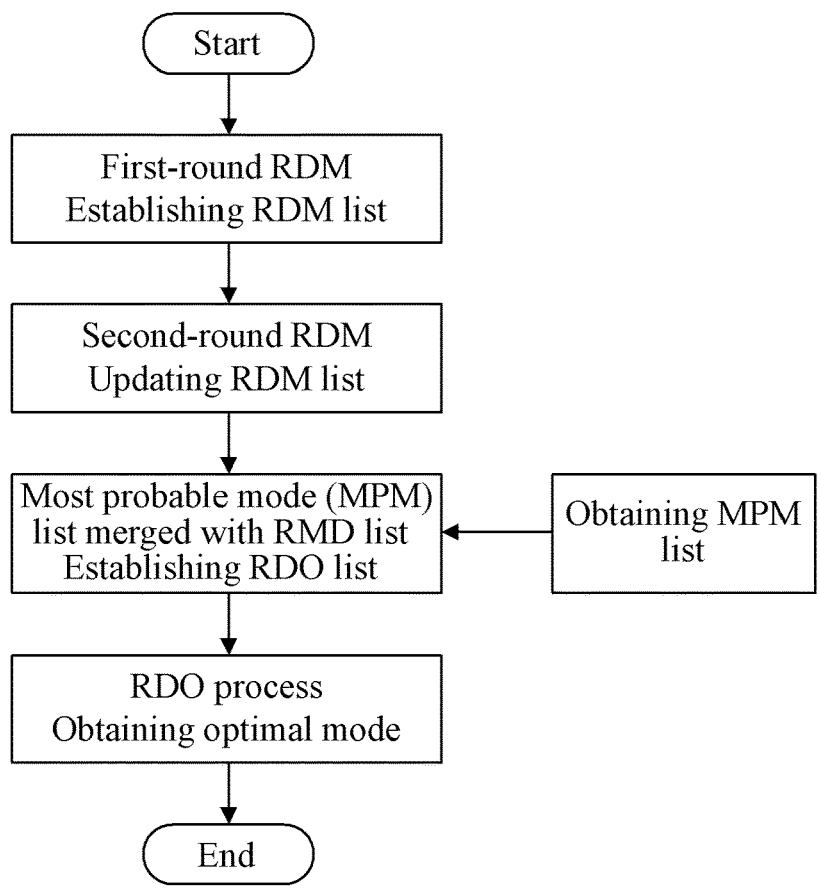
FIG. 4 is a process diagram of deciding an intra-frame angle mode according to an embodiment of the disclosure.

The intra-frame angle mode being decided based on the RMD candidate list of the length n includes: a first-round RMD process, a second-round RMD process, a most probable mode (MPM) process, and a rate distortion optimization (RDO) process, as shown in FIG. 4. To be specific in the first-round RMD process, a first-round RMD candidate list is established based on the length n. In the second-round RMD process, the mode values in the first-round RMD candidate list are uniformly added or subtracted by 1 and updated to obtain the second-round RMD candidate list. In the MPM process, an MPM list is calculated and obtained according to a mode of a left CU and a mode of an upper CU of the sub-CU block. In the RDO process, the MPM list is merged into the second-round RMD candidate list to obtain an RDO list. RDO calculation is performed on modes in the RDO list to decide an optimal mode as the intra-frame angle mode of the sub-CU block.

According to the results of related experiments, in the process of deciding the intra-frame angle mode, the RDO process occupies most of the time, approximately 90%, the time for MPM list construction is almost negligible, and the construction time for twice RDM list is also excessively low. Therefore, in this embodiment, the time for deciding the angle mode is shortened by reducing the length of the RDO list, so that the time-consuming RDO process is shortened. In the actual coding of the MPM list, only 1 or 2 modes are added to the RMD list, and therefore, a feasible method is to reduce the length n of the RMD list.

For a CU block with a simple texture and a large size, the mode is relatively single, and its spatial correlation with the surrounding blocks is high. In the case of a short RMD list, a favorable mode may still be obtained from the MPM list. In this case, setting n to 1 does not cause much distortion. This type of CU block meets the following conditions: when $w \geq w_{th}$, $h \geq h_{th}$, $var < var_{th}$, $NMSE < NMSE_{th}$, and $compT_H T_V < comp_{th}$, the length n is 1.

For a larger CU block with horizontal or vertical textures, n may be appropriately reduced and set to 2 because of its obvious directionality. This type of CU block meets the following conditions: $w \geq w_{th}$ && $h \geq h_{th}$ && ($ratioT_H T_V > th_H || 1/ratioT_H T_V > th_V$), and the length n is 2.

For a CU block whose size is small or whose texture direction is not obvious enough, in order to ensure the accuracy of mode decision, n is not reduced is still 3. That is, for a CU block that does not satisfy the above two types of conditions, the length n is 3.

Herein, w and h respectively are the width and the height the CU block, var and NMSE respectively are the variance of the pixel value and the normalized mean square error of the CU block, $compT_H T_V$ is the directional complexity, $ratioT_H T_V$ is the weight between the horizontal and vertical textures, $w_{th}$, $h_{th}$, $var_{th}$, $NMSE_{th}$, and $comp_{th}$ respectively are threshold values corresponding to w, h, var, NMSE, and $compT_H T_V$, $th_H$ is a threshold value of the horizontal angle mode, and $tth_V$ is a threshold value of the vertical angle mode. It should be noted that during the decision process of the intra-frame angle mode, the CU block is a sub-CU block of each pixel to be filled. In the above fast intra-frame mode decision algorithm, the length of the RMD list may be reduced by modifying the value of n of the RMD mode of different CU blocks, so that the time-consuming RDO operation is shortened.

In operation S3, RDO loss between each intra-frame block partition scheme and the current CU block is calculated after pixel filling, and intra-frame coding predictive coding is performed on the current CU block based on the intra-frame block partition scheme corresponding to the minimum RDO loss.

In operation S4, operation S1 to operation S3 are repeatedly executed until intra-frame predictive coding is performed on all CU blocks of the 360-degree video frame.

An intra-frame predictive coding method for a 360-degree video is provided in this embodiment. Based on the features of the 360° video and its texture distribution, predefined features are proposed, and the effectiveness of these features is verified by the Pearson correlation coefficient. The powerful fitting ability of the neural network is used to deal with the problem of intra-frame block partition, and the network is modified in combination with specific usage scenarios. In the case of ensuring the accuracy, the network is made as lightweight as possible, and the time-consuming RDO process is simplified by skipping unnecessary partition modes. In the proposed fast intra-frame mode decision algorithm, different RDM list construction parameters are set for different CUs, and the time-consuming RDO process is shortened by reducing the candidate mode list. Based on the above, the method provided in this embodiment can greatly save coding time.

Figure 5:
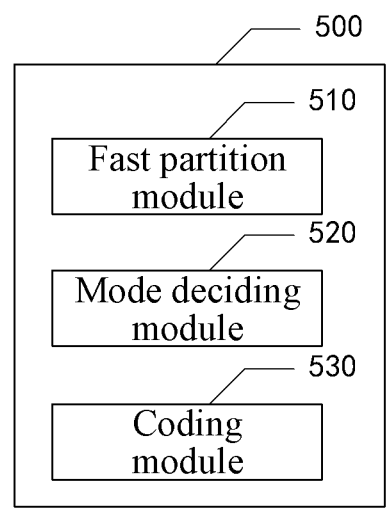
FIG. 5 is a block diagram of an intra-frame predictive coding system for a 360-degree video according to an embodiment of the disclosure.

FIG. 5 is a block diagram of an intra-frame predictive coding system for a 360-degree video according to an embodiment of the disclosure. With reference to FIG. 5, an intra-frame predictive encoding system for a 360-degree video 500 includes a fast partition module 510, a mode deciding module 520, and a coding module 530.

When executing operation S1, for example, the fast partition module 510 is configured to input a coding unit feature, a texture feature, and a 360-degree video feature of a CU block to be partitioned into a neural network corresponding to each partition mode when intra-frame block partition is performed on a current CU block, skip a partition mode in which the output of the neural network is smaller than a corresponding output threshold, perform the intra-frame block partition on the CU block to be partitioned according to a partition mode that is not skipped, and obtain a plurality of intra-frame block partition schemes of the current CU block. Intra-frame block partition modes include QT, BTH, BTV, TTH, and TTV, and the CU block to be partitioned is the current CU block or a sub-CU block obtained after each intra-frame block partition.

When executing operation S2, for example, the mode deciding module 520 is configured to determine a length n of a RMD candidate list according to the coding unit feature and the texture feature of the sub-CU block when an intra-frame angle mode is decided for each sub-CU block in each intra-frame block partition scheme, decide the intra-frame angle mode based on the RMD candidate list of the length n, and obtain the intra-frame angle mode to fill pixels in each intra-frame block partition scheme.

The coding module 530 executes operation S3 and operation S4, for example, and is configured to calculate RDO loss between each intra-frame block partition scheme and the current CU block after pixel filling and perform intra-frame coding predictive coding on the current CU block based on the intra-frame block partition scheme corresponding to the minimum RDO loss. The fast partition module 510, the mode deciding module 520, and the coding module 530 are repeatedly executed until intra-frame predictive coding is performed on all CU blocks of the 360-degree video frame.

The intra-frame predictive coding system for the 360-degree video 500 is configured to execute the intra-frame predictive encoding method for the 360-degree video shown in the embodiments of FIG. 1 to FIG. 4. Description of the details that are not provided in this embodiment may be found with reference to the intra-frame predictive coding method for a 360-degree video shown in the embodiments of FIG. 1 to FIG. 4, and such description therefore is not repeated herein.

The disclosure further provides a computer-readable storage medium storing a computer program, and the computer program implements the intra-frame predictive coding method for the 360-degree video shown in the embodiments of FIG. 1 to FIG. 4 when being executed by a processor.

In general, the above technical solutions provided by the disclosure have the following beneficial effects:

(1) Based on the features of the 360-degree video, multiple features are defined from three perspectives: the coding unit feature, the texture feature, and the 360-degree video feature. These features are effective features verified by the Pearson correlation coefficient, so that the reliability of the output results of the neural network is ensured. In this way, the reliability and accuracy of the skipping determination of the subsequent partition mode are improved, and the coding time is shortened while the coding reliability is ensured. While the key features are preserved, the influence of redundant features is reduced, over-fitting is avoided in the subsequent neural network model training process, and the generalization performance of the model is improved.

(2) A new algorithm for fast deciding the intra-frame angle mode is provided to classify CU blocks by using their sizes, textures, and other features. The RMD candidate lists of different types of CU blocks are reduced to different degrees, so as to further reduce the coding time under the premise of ensuring coding reliability.

(3) The trained classification model uses a lightweight neural network (LNN). The powerful fitting ability of the neural network is used to deal with the classification problems. Compared to the conventional machine learning models such as decision trees and random forests used in the currently-available methods, neural networks have obvious advantages in model building, training, and accuracy. Besides, the LNN and pre-trained models are able to be embedded into the versatile video coding (VVC) reference coding software VTM without additional deep learning library functions.

A person having ordinary skill in the art should be able to easily understand that the above description is only preferred embodiments of the disclosure and is not intended to limit the disclosure. Any modifications, equivalent replacements, and modifications made without departing from the spirit and principles of the disclosure should fall within the protection scope of the disclosure.

What is claimed is:

1. An intra-frame predictive coding method for a 360-degree video, comprising:

S1: inputting a coding unit feature, a texture feature, and a 360-degree video feature of a coding unit (CU) block to be partitioned into a neural network corresponding to each partition mode when intra-frame block partition is performed on a current CU block, skipping a partition mode in which the output of the neural network is smaller than a corresponding output threshold, performing the intra-frame block partition on the CU block to be partitioned according to a partition mode that is not skipped, and obtaining a plurality of intra-frame block partition schemes of the current CU block, wherein intra-frame block partition modes comprise quadtree (QT), binary tree horizontal (BTH), binary tree vertical (BTV), tertiary tree horizontal (TTH), and tertiary tree vertical (TTV), and the CU block to be partitioned is the current CU block or a sub-CU block obtained after each intra-frame block partition, wherein the coding unit feature comprises: several ones of a width, a height, a depth, a quadtree depth, a multi-tree depth, a block shape ration, a quantization parameter, a horizontal angle mode type, and a vertical angle mode type of a CU block, the texture feature comprises: several ones of a variance of a pixel value, a normalized mean square error, a horizontal texture factor, a vertical texture factor, a weight between the horizontal and vertical textures, and directional complexity of the CU block, and the 360-degree video feature comprises a latitude of the CU block and a sampling factor at each latitude;

S2: determining a length n of a rough mode decision (RMD) candidate list according to the coding unit feature and the texture feature of the sub-CU block when an intra-frame angle mode is decided for each sub-CU block in each intra-frame block partition scheme, deciding the intra-frame angle mode based on the RMD candidate list of the length n, and obtaining the intra-frame angle mode to fill pixels in each intra-frame block partition scheme, wherein when $w \geq w_{th}$, $h \geq h_{th}$, $var < var_{th}$, $NMSE < NMSE_{th}$, and $compT_H T_V < comp_{th}$), the length n is 1, and when $w \geq w_{th} \&\& h \geq h_{th} \&\&$ ($ratioT_H T_V > th_H \| 1/ratioT_H T_V > th_V$), the length n is 2; otherwise, the length n is 3, where w and h respectively are the width and the height the CU block, var and NMSE respectively are the variance of the pixel value and the normalized mean square error of the CU block, $compT_H T_V$ is the directional complexity, $ratioT_H T_V$ is the weight between the horizontal and vertical textures, $w_{th}$, $h_{th}$, $Var_{th}$, $NMSE_{th}$, and $comp_{th}$ respectively are threshold values corresponding to w, h, var, NMSE, and $compT_H T_V$, $th_H$ is a threshold value of the horizontal angle mode, and $th_V$ is a threshold value of the vertical angle mode;

S3: calculating rate distortion optimization (RDO) loss between each intra-frame block partition scheme and the current CU block after pixel filling and performing intra-frame coding predictive coding on the current CU block based on the intra-frame block partition scheme corresponding to the minimum RDO loss; and S4: repeatedly executing S1 to S3 until intra-frame predictive coding is performed on all CU blocks of the 360-degree video frame.

2. The intra-frame predictive coding method for the 360-degree video according to claim 1, wherein in the BTH and TTH partition modes, the block shape ration is h/(w+h), in the BTV and TTV partition modes, the block shape ration is w/(w+h), and in the QT partition mode, the block shape ration is 0.5, wherein w and h are the width and height of the CU block, respectively.

3. The intra-frame predictive coding method for the 360-degree video according to claim 1, wherein the weights and directional complexity of the horizontal texture factor, the vertical texture factor, and the horizontal and vertical texture are:

$$Texture_H = \frac{\sum_{i=2}^{w-1}\sum_{j=2}^{h-1}|Sobel_H * P_{3\times3}(i,j)|}{(w-2)\times(h-2)},$$

$$Texture_V = \frac{\sum_{i=2}^{w-1}\sum_{j=2}^{h-1}|Sobel_V * P_{3\times3}(i,j)|}{(w-2)\times(h-2)},$$

$ratioT_H T_V = Texture_H/Texture_V$, and $ratioT_H T_V = Texture_H/Texture_V$, where $Texture_H$ is the horizontal texture factor, $Texture_V$ is the vertical texture factor, $ratioT_H T_V$ is the weight between the horizontal and vertical textures, $compT_H T_V$ is the directional complexity, w and h are the width and height of the CU block respectively, $Sobel_H$ is a horizontal Sobel operator, $Sobel_V$ is a vertical Sobel operator, $P_{3\times3}(i,j)$ represents a 3×3 matrix centered on the pixel with coordinates (i,j), and * is a convolution operation.

4. The intra-frame predictive coding method for the 360-degree video according to claim 1, wherein the sampling factor at each latitude is:

$K_{Latitude} = 1/\cos(Latitude)$, where $K_{Latitude}$ is the sampling factor at the Latitude latitude.

5. The intra-frame predictive coding method for the 360-degree video according to claim 1, wherein the deciding the intra-frame angle mode based on the RMD candidate list of the length n comprises:
establishing a first-round RMD candidate list based on the length n, uniformly adding 1 or uniformly subtracting 1 to mode values in the first-round RMD candidate list, and performing updating to obtain a second-round RMD candidate list;
calculating and obtaining a most probable mode (MPM) list according to a mode of a left CU and a mode of an upper CU of the sub-CU block and merging the MPM list into the second-round RMD candidate list to obtain an RDO list; and
performing RDO calculation on modes in the RDO list to decide an optimal mode as the intra-frame angle mode of the sub-CU block.

6. The intra-frame predictive coding method for the 360-degree video according to claim 2, wherein the deciding the intra-frame angle mode based on the RMD candidate list of the length n comprises:
establishing a first-round RMD candidate list based on the length n, uniformly adding 1 or uniformly subtracting 1 to mode values in the first-round RMD candidate list, and performing updating to obtain a second-round RMD candidate list;
calculating and obtaining a most probable mode (MPM) list according to a mode of a left CU and a mode of an upper CU of the sub-CU block and merging the MPM list into the second-round RMD candidate list to obtain an RDO list; and
performing RDO calculation on modes in the RDO list to decide an optimal mode as the intra-frame angle mode of the sub-CU block.

7. The intra-frame predictive coding method for the 360-degree video according to claim 3, wherein the deciding the intra-frame angle mode based on the RMD candidate list of the length n comprises:
establishing a first-round RMD candidate list based on the length n, uniformly adding 1 or uniformly subtracting 1 to mode values in the first-round RMD candidate list, and performing updating to obtain a second-round RMD candidate list;
calculating and obtaining a most probable mode (MPM) list according to a mode of a left CU and a mode of an upper CU of the sub-CU block and merging the MPM list into the second-round RMD candidate list to obtain an RDO list; and
performing RDO calculation on modes in the RDO list to decide an optimal mode as the intra-frame angle mode of the sub-CU block.

8. The intra-frame predictive coding method for the 360-degree video according to claim 4, wherein the deciding the intra-frame angle mode based on the RMD candidate list of the length n comprises:
establishing a first-round RMD candidate list based on the length n, uniformly adding 1 or uniformly subtracting 1 to mode values in the first-round RMD candidate list, and performing updating to obtain a second-round RMD candidate list;
calculating and obtaining a most probable mode (MPM) list according to a mode of a left CU and a mode of an upper CU of the sub-CU block and merging the MPM list into the second-round RMD candidate list to obtain an RDO list; and
performing RDO calculation on modes in the RDO list to decide an optimal mode as the intra-frame angle mode of the sub-CU block.

9. The intra-frame predictive coding method for the 360-degree video according to claim 1, wherein the intra-frame block partition is performed on the CU block to be partitioned according to the partition mode that is not skipped in S1 and the CU block to be partitioned is not partitioned to generate the plurality of intra-frame block partition schemes of the current CU block.

10. An intra-frame predictive coding system for a 360-degree video, comprising:
a processor; and
a storage medium coupling to the processor, and the storage medium comprises:
a fast partition module, executed by the processor, is configured to input a coding unit feature, a texture feature, and a 360-degree video feature of a coding unit (CU) block to be partitioned into a neural network corresponding to each partition mode when intra-frame block partition is performed on a current CU block, skip a partition mode in which the output of the neural network is smaller than a corresponding output threshold, perform the intra-frame block partition on the CU block to be partitioned according to a partition mode that is not skipped, and obtain a plurality of intra-frame block partition schemes of the current CU block, wherein intra-frame block partition modes include quadtree (QT), binary tree horizontal (BTH), binary tree vertical (BTV), tertiary tree horizontal (TTH), and tertiary tree vertical (TTV), and the CU block to be partitioned is the current CU block or a sub-CU block obtained after each intra-frame block partition,
wherein the coding unit feature comprises: several ones of a width, a height, a depth, a quadtree depth, a multi-tree depth, a block shape ration, a quantization parameter, a horizontal angle mode type, and a vertical angle mode type of a CU block,
the texture feature comprises: several ones of a variance of a pixel value, a normalized mean square error, a horizontal texture factor, a vertical texture factor, a weight between the horizontal and vertical textures, and directional complexity of the CU block, and
the 360-degree video feature comprises a latitude of the CU block and a sampling factor at each latitude;
a mode deciding module, executed by the processor, is configured to determine a length n of a rough mode decision (RMD) candidate list according to the coding unit feature and the texture feature of the sub-CU block when an intra-frame angle mode is decided for each sub-CU block in each intra-frame block partition scheme, decide the intra-frame angle mode based on the RMD candidate list of the length n, and obtain the intra-frame angle mode to fill pixels in each intra-frame block partition scheme,
wherein when $w \geq w_{th}$, $h \geq h_{th}$, $var < var_{th}$, $NMSE < NMSE_{th}$, and $compT_H T_V < comp_{th}$), the length n is 1, and
when $w \geq w_{th} \&\& h \geq h_{th} \&\&$ ($ratioT_H T_V > th_H \| 1/ratioT_H T_V > th_V$), the length n is 2; otherwise, the length n is 3,
where w and h respectively are the width and the height the CU block, var and NMSE respectively are the variance of the pixel value and the normalized mean square error of the CU block, $compT_HT_V$ is the directional complexity, ratio-$T_HT_V$ is the weight between the horizontal and vertical textures, $w_{th}$, $h_{th}$, $var_{th}$, $NMSE_{th}$, and $comp_{th}$ respectively are threshold values corresponding to w, h, var, NMSE, and $compT_HT_V$, thy is a threshold value of the horizontal angle mode, and thy is a threshold value of the vertical angle mode;

and a coding module, executed by the processor, is configured to calculate rate distortion optimization (RDO) loss between each intra-frame block partition scheme and the current CU block after pixel filling and perform intra-frame coding predictive coding on the current CU block based on the intra-frame block partition scheme corresponding to the minimum RDO loss, wherein the fast partition module, the mode deciding module, and the coding module are repeatedly executed until intra-frame predictive coding is performed on all CU blocks of the 360-degree video frame.

\* \* \* \* \*